Nov. 6, 1956 M. THOMPSON 2,769,566
FILLING PLUG FOR FUEL AND PRESSURE CONTAINERS
Filed Oct. 23, 1953

INVENTOR.
Morris Thompson
BY
George Renehan
ATTORNEY.

2,769,566

FILLING PLUG FOR FUEL AND PRESSURE CONTAINERS

Morris Thompson, Baltimore, Md., assignor to the United States of America as represented by the Secretary of the Army Application October 23, 1953, Serial No. 388,077

1 Claim. (Cl. 220—44)

(Granted under Title 35, U. S. Code (1952), sec. 266)

The invention described herein may be manufactured and used by or for the Government of the United States of America for governmental purposes without the payment to me of any royalty thereon.

This invention relates to a vented plug closure for metallic receptacles.

An object of this invention is to provide a filling plug for a tank in which liquid is maintained under gas pressure, which plug is provided with venting means for the release of the gas pressure when desired.

A further object of the invention is to provide a vented sealing plug which may be used under high pressures, such as are employed in the pressure tanks of flame throwers.

A further object of the invention is to provide a vented filling cap so constructed that the vent may be connected to a pressure gauge.

A further object of the invention is to provide a vented plug in which the vent may be easily and safely operated.

A further object of the invention is to provide a vented plug which can be readily disassembled for cleaning.

A further object of the invention is to provide a vented plug which can be readily made by simple machining operations.

In the accompanying drawings.

Figure 1:
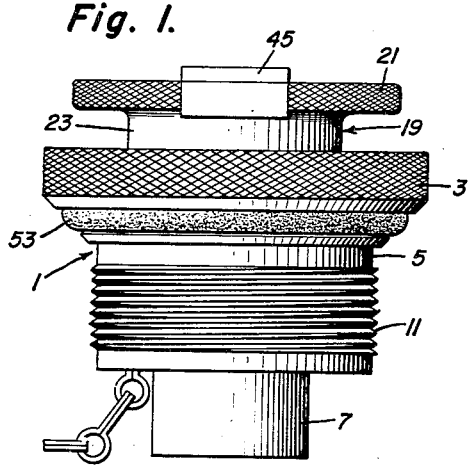
Figure 1 is an elevation.
Figure 2:
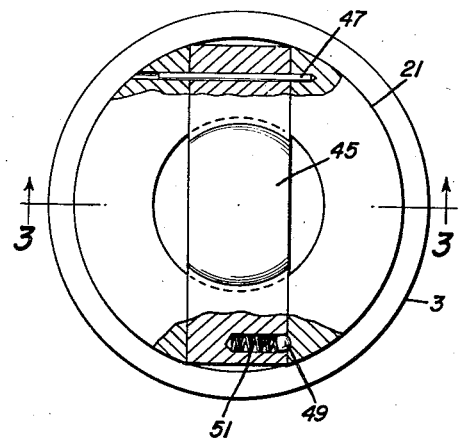
Figure 2 is a plan view having parts broken away to show interior construction.

In portable flame throwers, the fuel tank is maintained under very high pressure. It is necessary to release this pressure upon cancellation of a mission after the tank has been pressurized, as well as under various other conditions. It is also necessary to attach a pressure gauge to the tank and, of course, to introduce fuel into the tank.

It is desirable, for simplicity of construction and to reduce weight, that as many of these functions as possible be carried out by a single element. The element must be of such construction that it will be readily and safely operable under the extremely high pressures involved. It is desirable, also, that the element be of such form that it can be disassembled and cleaned to keep it in good operating condition.

The plug will now be described in detail. It comprises a plug body 1, having an upper rim portion 3, and an outer cylindrical portion 5, and an inner cylindrical portion 7, connected by a flange 9. On the exterior of outer cylindrical portions 5 are provided threads 11 while inner cylindrical portion 7 has on its interior a threaded portion 13. At the lower or axially inner end of inner cylindrical portion 7 is a radially inwardly extending valve seat 15 and an unthreaded portion 17 having a diameter the same as or greater than the outer diameter of threads 13. (The term "axially inner" is used to designate the end which in use extends into the tank.)

Mounted within the body portion 1 is a vent member including a cup member 19. This cup member has an upper wheel portion 21, a cup body 23, and a nose 25. The nose is provided with an upper tapped opening 27. Below the tapped opening is a central bore 29. Extending outwardly from central bore 29 are radial bores 31. At the lower end of the nose is mounted a valve disk 33 having frustoconical surface 35. This valve disk is screwed into the lower or axially inner end of the nose and is secured by a lock washer 37. The valve seat and valve disk are proportioned so as to make substantially line contact with each other.

Mounted within the cup is a vent plug 39 provided with pipe threads which engage the tapped opening 27. The plug 39 is provided with a central passageway 41. This plug is shown as provided with a shoulder 43 formed to engage a quick-connect type coupling. However, it may be provided with a union or any other suitable type of pipe coupling if desired. The coupling of whatever type is provided in order that the plug may be connected to a pressure gauge (not shown). A lever 45 is pivotally mounted on wheel portion 21 by means of a pin 47. The lever is also equipped with a latch comprising a ball 49 and a spring 51. It is also provided with a cavity 52 formed to fit over vent plug 39. The plug body 1 is provided with a flexible ring seal 53 which is mounted within an annular channel 55. This seal engages the wall of the receptacle opening in a manner which will be obvious. A sealing ring 57 which is held in place by annular shoulder 59 forms a seal between the cup and the body member.

Figure 3:
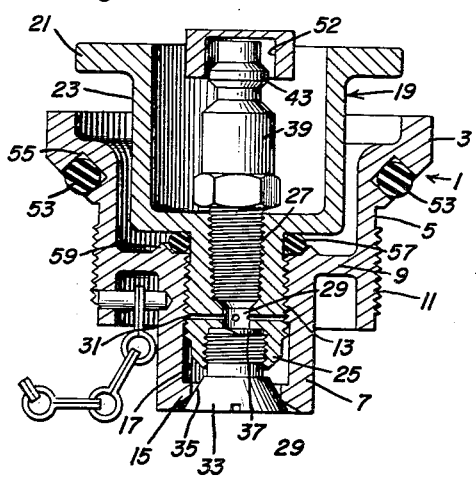
Figure 3 is a vertical section on line 3—3 (Figure 2) showing the device with the vent closed.

The operation of the plug will now be described. The normal or closed condition of the plug is shown in Figure 3. It will be noted that the frustoconical surface 35 of valve disk 33 is in tight engagement with valve seat 15. Moreover, the outer ends of the radial bores 31 terminate within the threaded portion 13. The threads thus form a labyrinth seal. The flexible sealing ring 57 completes the seal. The lever 45 acts as a cover to exclude foreign material from central passageway 41.

When it is desired to vent the gas within the container, the lever 45 is raised to uncover the passageway 41. The lever may be swung outwardly and grasped by the operator in order to assist in turning the cup. The cup may also be grasped by wheel portion 21. The cup is then screwed inwardly to the position shown in Figure 4. In this position, the radial bores 31 open into the unthreaded portion 17 of the inner cylindrical member of the plug body. The frustoconical surface 35 of valve disk 33 is disengaged from the valve seat 15. Thus, the gas may flow between surface 35 and seat 15 upwardly through the unthreaded portion 17, inwardly through radial bores 31 and out through central passageway 41.

Figure 4:
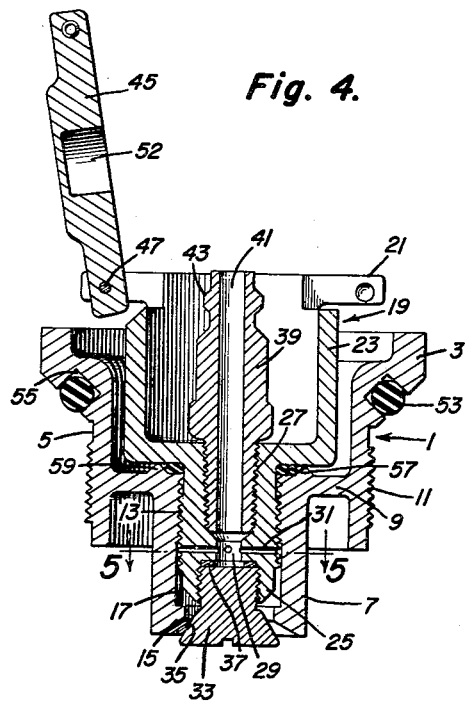
Figure 4 is a vertical section similar to Figure 3, but showing the vent opened.
Figure 5:
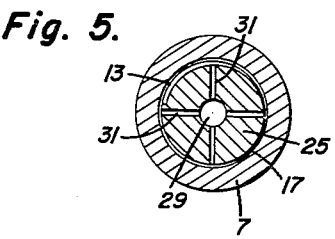
Figure 5 is a transverse section on line 5—5 of Figure 4.

If the pressure gauge is to be used, it is connected to the upper portion of plug 39 and the cup member is screwed to the position shown in Figure 4 when it is desired to measure the pressure. If the operator wishes to remove the pressure gauge, it is merely necessary to screw the cup to the position shown in Figure 3 and disconnect the gauge from the plug 39.

When it is desired to disassemble the plug for cleaning, valve disk 33 is unscrewed from nose 25, cup member 19 is unscrewed from the plug body 1 and vent plug 39 is unscrewed from the cup member. All surfaces are then readily accessible for cleaning.

I claim:

A vented plug closure for metallic receptacles comprising a plug body member including an externally threaded outer cylindrical wall member provided with external threads to engage said receptacle, an inner cylindrical member positioned within said outer cylindrical wall member and a flange joining an axially inner portion of said outer cylindrical member with the axially outer portion of said inner cylindrical member thereby forming a cup-shaped inclosure; a vent member comprising a cup member positioned within said cup-shaped enclosure and a nose portion extending axially inwardly from said cup member and in engagement with the interior of said inner cylindrical member, said cup member extending axially outwardly past said cup-shaped inclosure, hand grip means on the axially outer portion of said cup member; a vent plug mounted within said nose portion and extending axially outwardly for a substantial distance within said cup means, coupling means on the axially outer portion of said vent plug, a central passageway extending axially of said vent plug; said inner cylindrical member having an internally threaded portion, and said nose having an externally threaded portion in engagement therewith; said inner cylindrical member terminating at its axially inner end in a valve seat, and having an enlarged internal section between said internally threaded portion and said valve seat, said enlarged internal section having an internal diameter at least as great as the maximum diameter of the externally threaded portion of said nose member; said nose member carrying at its axially inner end a valve disk, said valve disk having a frustoconical surface radially within and extending past said valve seat, said seat and disk being formed so as to make substantially line contact; a central bore in said nose member in alignment and communication with said central passageway, at least one radial bore extending from said central bore to said externally threaded portion; said parts being so proportioned that when said cup member is turned in one direction said nose member may be screwed inwardly to a point where said valve disk is disengaged from said valve seat and the outer ends of said radial bores are positioned within said enlarged internal section, while when it is turned in the other direction the said nose portion may be screwed outwardly until said valve disk contacts said valve seat and the outer ends of said radial bores are positioned within said internally threaded portion, said handgrip means including a wheel portion extending outwardly from said cup member and a lever pivotally mounted on said wheel portion in such a manner that when swung into one position it extends across the end of said vent plug and said cup member and when in another position it extends outwardly from said cup member.

References Cited in the file of this patent

UNITED STATES PATENTS

| | | |
|---|---|---|
| 43,218 | Ghan | June 21, 1864 |
| 45,610 | Hurst | Dec. 27, 1864 |
| 321,520 | O'Brien | July 7, 1885 |
| 801,581 | Franke | Oct. 10, 1905 |
| 1,717,573 | McAtee | June 18, 1929 |
| 2,083,156 | McCabe | June 8, 1937 |

FOREIGN PATENTS

| | | |
|---|---|---|
| 3,672 | Great Britain | 1877 |
| 184,847 | Switzerland | Sept. 1, 1936 |